US010598329B2

(12) United States Patent
Gloss et al.

(10) Patent No.: US 10,598,329 B2
(45) Date of Patent: Mar. 24, 2020

(54) LIGHT-CONDUCTIVE OPTICAL SYSTEM, ESPECIALLY FOR A LIGHT DEVICE OF A VEHICLE

(71) Applicant: Varroc Lighting Systems, s.r.o., Senov u Noveho Jicina (CZ)

(72) Inventors: Tomas Gloss, Vitkov (CZ); Jakub Hruska, Hlucin (CZ); Vit Simurda, Novy Jicin (CZ); Jan Hanko, Dolny Kubin (SK)

(73) Assignee: Varric Lighting Sytems, S.R.O., Senov U Noveho (CZ)

( * ) Notice: Subject to any disclaimer, the term of this patent is extended or adjusted under 35 U.S.C. 154(b) by 0 days.

(21) Appl. No.: 16/128,019

(22) Filed: Sep. 11, 2018

(65) Prior Publication Data
US 2019/0078745 A1 Mar. 14, 2019

(30) Foreign Application Priority Data
Sep. 14, 2017 (CZ) .............................. PV 2017-541

(51) Int. Cl.
*F21S 41/00* (2018.01)
*F21S 41/24* (2018.01)
(Continued)

(52) U.S. Cl.
CPC ............. *F21S 41/24* (2018.01); *F21S 41/143* (2018.01); *F21S 41/151* (2018.01);
(Continued)

(58) Field of Classification Search
CPC ... G02B 6/0018; G02B 6/0023; F21S 41/322; F21S 41/24
See application file for complete search history.

(56) References Cited

U.S. PATENT DOCUMENTS

| 7,401,948 B2 | 7/2008 | Chinniah et al. |
| 2006/0087860 A1 | 4/2006 | Ishida |
| (Continued) | | |

FOREIGN PATENT DOCUMENTS

| CZ | 20050096 A3 | 10/2006 |
| CZ | 20160183 A3 | 10/2017 |
| (Continued) | | |

OTHER PUBLICATIONS

Search Report from Corresponding Application CZ PV 2017-541 dated Jun. 11, 2018 (3 pages).

*Primary Examiner* — Gerald J Sufleta, II
(74) *Attorney, Agent, or Firm* — Hovey Williams LLP

(57) ABSTRACT

The light-conductive optical system comprises a planarly shaped light guide (1) made from an optically transparent material with an associated light unit (3) and a collimating element (2). The light guide (1) comprises an output surface (12) for the output of light rays (10) and a binding surface (11) to bind light rays (10) to the light guide (1). The output surface (12) and the binding surface (11) are situated on surfaces that transversally connect the top (5) and bottom surface (6) of the light guide (1) and the binding surface (11) comprises a partial surface (11c) situated opposite the output surface (22) of the collimating element (2) and a lateral partial surface (11a, 11b) at one or both sides of the partial surface (11c). The height (v) of the output surface (22) is bigger than the thickness (t) of the light guide (1) so the output surface (22) reaches above the top surface (5) and/or below the bottom surface (6) of the light guide (1) with its overlapping part (8, 9). The light guide (1) is, for each overlapping part (8, 9), fitted with at least a pair of reflective means (4a, 4b; 4c) comprising the first reflective means (4a, 4b) situated opposite the overlapping part (8, 9) to bind at least a part of light rays (10) exiting from the overlapping (Continued)

Figure 1:
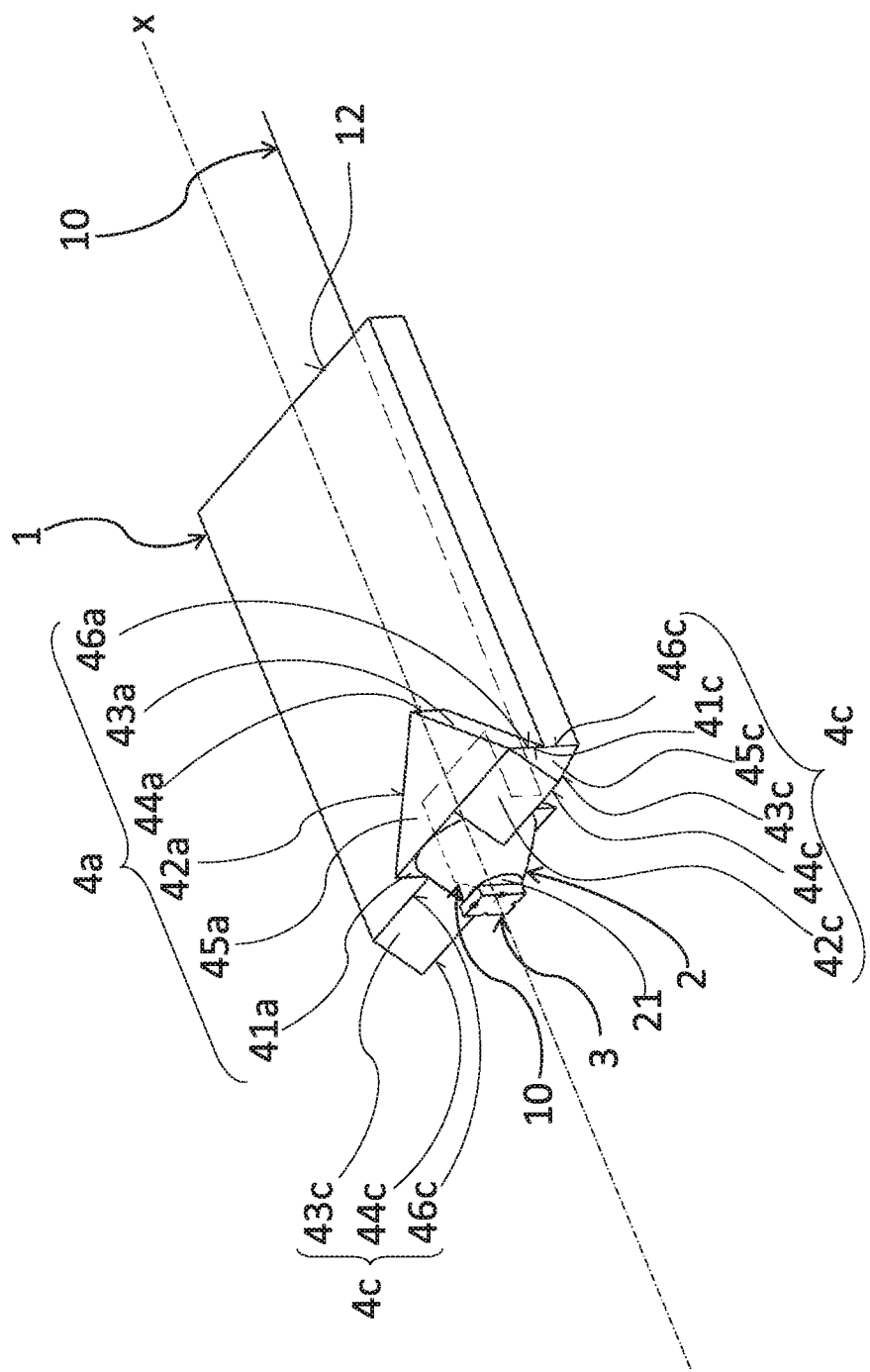

part (8, 9) and to reflect them to the second reflective means (4*c*) adapted to direct light rays (10) against the lateral partial surface (11*a*, 11*b*).

14 Claims, 21 Drawing Sheets

(51) Int. Cl.
    *F21V 8/00*     (2006.01)
    *F21S 43/249*     (2018.01)
    *F21S 43/40*     (2018.01)
    *F21S 43/239*     (2018.01)
    *F21S 43/14*     (2018.01)
    *F21S 41/32*     (2018.01)
    *F21S 43/243*     (2018.01)
    *F21S 41/151*     (2018.01)
    *F21S 43/241*     (2018.01)
    *F21S 43/15*     (2018.01)
    *F21S 43/31*     (2018.01)
    *F21S 41/143*     (2018.01)

(52) U.S. Cl.
    CPC ............ *F21S 41/322* (2018.01); *F21S 43/14* (2018.01); *F21S 43/15* (2018.01); *F21S 43/239* (2018.01); *F21S 43/241* (2018.01); *F21S 43/243* (2018.01); *F21S 43/249* (2018.01); *F21S 43/315* (2018.01); *F21S 43/40* (2018.01); *G02B 6/003* (2013.01); *G02B 6/0023* (2013.01); *G02B 6/0031* (2013.01); *G02B 6/0045* (2013.01); *G02B 6/0066* (2013.01); *G02B 6/0018* (2013.01); *G02B 6/0028* (2013.01); *G02B 6/0078* (2013.01)

(56) References Cited

U.S. PATENT DOCUMENTS

| | | | |
|---|---|---|---|
| 2006/0164839 A1* | 7/2006 | Stefanov | G02B 6/0018 362/327 |
| 2007/0242463 A1 | 10/2007 | Futami | |
| 2008/0260328 A1* | 10/2008 | Epstein | G02B 6/0018 385/32 |
| 2009/0231846 A1 | 9/2009 | Nakajima | |
| 2011/0216549 A1* | 9/2011 | Futami | B60Q 1/0041 362/516 |
| 2012/0218772 A1 | 8/2012 | Mitsuhashi et al. | |
| 2015/0168636 A1* | 6/2015 | Holman | F21V 5/02 362/609 |
| 2015/0247613 A1 | 9/2015 | Doha et al. | |
| 2016/0139323 A1* | 5/2016 | Remhof | G02B 6/0018 362/609 |
| 2016/0230948 A1* | 8/2016 | Kratochvil | F21S 41/147 |
| 2017/0284624 A1 | 10/2017 | Gloss et al. | |
| 2018/0038569 A1* | 2/2018 | Hanulak | F21S 43/50 |
| 2018/0246270 A1* | 8/2018 | Di Trapani | F21S 8/04 |
| 2018/0292054 A1* | 10/2018 | Cornelissen | G02B 19/0066 |
| 2019/0011103 A1* | 1/2019 | Suwa | F21S 41/27 |
| 2019/0212560 A1* | 7/2019 | Sugiyama | B60K 35/00 |

FOREIGN PATENT DOCUMENTS

| | | | |
|---|---|---|---|
| FR | 2966224 A1 | | 4/2012 |
| JP | 2012174658 A | * | 9/2012 |
| JP | 5692517 B2 | | 4/2015 |
| JP | 6082264 B2 | | 2/2017 |
| WO | 2008069143 A1 | | 6/2008 |

* cited by examiner

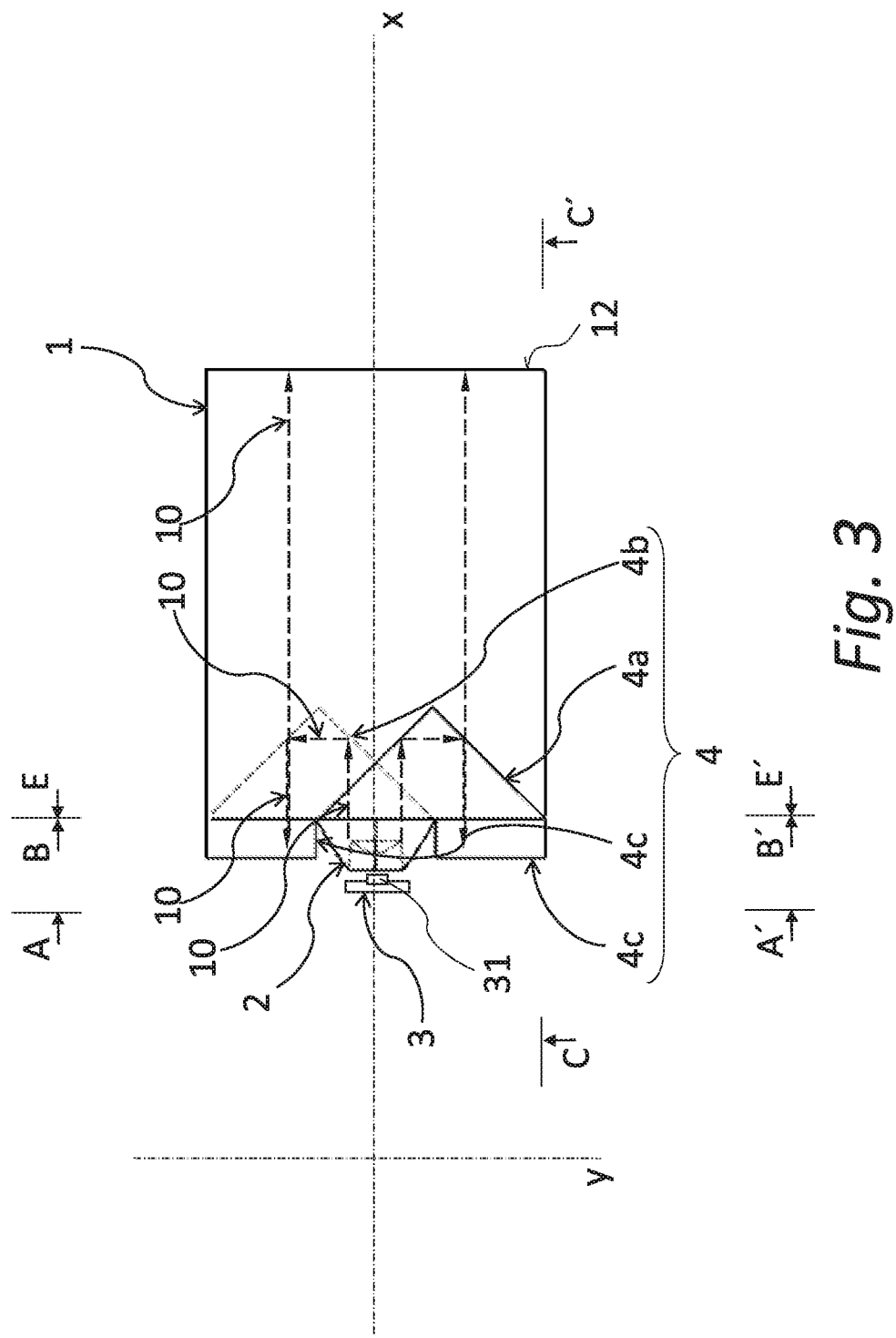

LIGHT-CONDUCTIVE OPTICAL SYSTEM, ESPECIALLY FOR A LIGHT DEVICE OF A VEHICLE

RELATED APPLICATIONS

This application claims the priority benefit of Czech Patent Application Serial No. PV 2017-541 entitled "A light-conductive optical system, especially for a light device of a vehicle," filed Sep. 14, 2017, the entire disclosure of which is incorporated herein by reference.

FIELD OF THE INVENTION

The invention relates to a light-conductive optical system, especially for a light device of a vehicle, that comprises a light guide and a collimating element to conduct light emitted by a light source.

BACKGROUND INFORMATION

A common drawback of known light guides used for light devices of motor vehicles is the fact that a certain part of the light emitted by the light sources is not used or that the required shape of the output surface of the light guide does not support efficient use of the emitted light, which reduces the light efficiency of the light guide. In the field of the design of light guides and light-guiding systems, there is a permanent effort to propose such designs that will bring an increase of their light efficiency and ensure homogeneity of the output light beam.

The documents U.S. Pat. No. 7,401,948B2 and WO2008069143A1 disclose collimating elements that comprise a central recess for efficient binding of light rays from the light source to the body of the collimating element. In principle, in one recess of a collimating element just one LED light source can be used. The body of these collimating elements comprises a central lens to direct emitted light rays in a straight direction as well as lateral segments to direct emitted light rays in an indirect direction.

Examples of known designs of a light guide striving to increase the light efficiency are the solutions described in the documents JP06082264B2 and CZ20050096A3. These solutions are based on using configured reflective surfaces for total reflection of light rays and sending them to the required direction. However, a disadvantage of this solution is that efficient use of light emitted by the light sources is not made possible because maximum binding of light rays emitted by the light source is not enabled. Another disadvantage is the shape of the light guide, which is not adaptable to the mechanical design of the light device.

From the documents FR2966224A1 and US20150247613A1, lighting and/or signaling devices for a motor vehicle are known that comprise a light source and a light-guiding plate that has a surface for the entry of light rays and an output edge/surface and is configured to spread light rays towards the output surface. The light-guiding plate comprises a collimator with a surface for the entry of light rays emitted by the light source and with a transitional surface for the output of the collimated light beam from the collimator into the body of the light-guiding plate, this collimator being positioned with respect to the plate in such a way for the axis of the collimated beam to be oriented in the thickness direction of this plate, preferably in the vertical direction. The light-guiding plate comprises reflective means which light rays from the transitional surface of the collimators are sent to. The reflective means is designed as an array of reflective surfaces configured to direct rays of the collimated beam towards the output surface, i.e. to deflect light rays from the vertical plane to the horizontal plane. The reflective means is designed as an array of at least three reflective surfaces wherein a part of light rays is directly sent to the output surface, another part of light rays being routed to the output surface indirectly. Light rays are first directed from the reflective surfaces towards the lateral edges of the light-guiding plate where reflective surfaces adapted to direct light rays towards the output surface of the light-guiding plate are situated. The first disadvantage of this solution is uneven distribution of light intensity on the output surface of the light-guiding plate as at least two reflective surfaces of the reflective means have a common edge in each case, i.e. they are not spatially offset, i.e. they have a constant shape of a sector of a circle, and on the output surface, patterns are projected in the form of discontinuous regions with an unsymmetrical shape that do not respect the shape of the output surface. Thus, the light guide can only project light patterns having the shape of a sector of a circle or a shape similar to a sector of a circle through its output surface. Another disadvantage is that the size of the reflective surfaces of the reflective means cannot be changed to adapt the optical concept to the mechanical design of the lighting device. The third disadvantage is the fact that the ratio of the width to the thickness of the light guide is fixed and the shape of the collimator determines the shape of the reflective means and thus the shape of projected patterns on the output surface, which makes redistribution of the intensity of light emitted from individual reflective surfaces of the reflective means through the reflective means impossible and it is not possible to divide light into two separate light guides either.

At present, vehicle designers often require that the output light surfaces of some function having a designer shape be as thin as possible, on the order of several millimeters. However, this requirement encounters several technical problems. For example, from the document CZ201600183, a light guide is known that comprises at least one transitional surface that is, in the profile of the light-conductive body towards the output surface, inclined to the longitudinal axis of the profile while a collimating element is situated at the input surface and the output surface can be defined as a thin one. A disadvantage of this solution is the fact that the dimensions of the light guide must be selected in such a way that either the output surface is thin, but the light efficiency of the light guide is not high, or the light efficiency is high and the output light surface is not as thin.

A light-conductive system is known from the document JP5692517 that comprises a planarly shaped light guide of a plate-like shape and a collimating element having the form of a rotary body. The light guide and the collimating element form an integral body that is made from an optically transparent material and is used to guide light rays emitted by the light unit comprising at least one light source, e.g. LED. The outer shell of the light guide is fitted with an array of reflective surfaces to create light patterns on the output surface of the light guide. Two lateral reflective surfaces situated at the collimator form a reflective means to direct light rays to two separate assemblies of reflective surfaces gradually directing light rays to the output surface. For the use of a very thin planar light guide, e.g. with the thickness of 2 mm, the smallest possible collimating element with the diameter of 4 mm can be used. In case of a long output surface of the light guide, a higher number of collimating elements and light sources needs to be used. Another disadvantage of this solution is the fact that the light beam gets divided especially over the center of the collimating element, which may cause a loss of efficiency and even small production defects/deviations can result in a significant loss of efficiency.

The object of the present invention is to solve the issue of increasing the light efficiency of collimating elements connected to a very thin, planarly shaped light guide without a large number of light sources having to be used to ensure the required light characteristic. Thus, the task of the invention is to propose a light-conductive optical system that makes it possible to fulfill the required light function, including high light efficiency and even distribution of the light intensity on the output surface when a thin, planarly shaped light guide is used. Another object is to make sure that the light-conductive system is adaptable to requirements resulting from the mechanical and optical design of the lighting device with acceptable financial requirements for the production.

SUMMARY OF THE INVENTION

The above-mentioned objects of the invention are fulfilled by a light-conductive system comprising at least one planarly shaped light guide made from an optically transparent material with an associated light unit and a collimating element to collimate light rays emitted from the light unit wherein the light guide comprises on its edges an output surface for the output of light rays conducted by the light guide out of the light guide, and a binding surface to bind light rays to the light guide wherein the output surface and the binding surface are situated on surfaces that transversally connect the top and bottom surface of the light guide, and the binding surface comprises a partial surface situated opposite the output surface of the collimating element, and at one or both sides of the partial surface, a lateral partial surface continuing the partial surface. The height of the output surface of the collimating element is bigger than the thickness of the light guide in the place of the said partial surface so the output surface protrudes above the top surface and/or below the bottom surface of the light guide with its overlapping part, and the light guide is, for each overlapping part, fitted with at least a pair of reflective means while in each pair, the first reflective means is situated with its input surface opposite the overlapping part to bind at least a part of light rays exiting from the overlapping part to the first reflective means and to reflect them to the second reflective means adapted to direct light rays against the lateral partial surface by reflection.

In a preferred embodiment, the said second reflective means is situated with its output surface opposite the said lateral partial surface.

In one of the preferred embodiments, the light-conductive optical system comprises two overlapping parts.

In one of the preferred embodiments, the height of the output surface of the collimating element amounts to three times the thickness of the light guide and the heights of the overlapping parts are equal to the thickness of the light guide each.

In one of the preferred embodiments, the light guide is, for each overlapping part, equipped with at least two pairs of reflective means, the first reflective means of these pairs being positioned on each other so that their input surfaces positioned one over another form a continuous input surface and the projection of the overlapping part in the direction of the output of light rays from the overlapping part is completely included in this continuous input surface. The second reflective means of the said pairs are preferably positioned next to each other with their output surfaces opposite the said lateral surface.

In one of the preferred embodiments, the number n of the said parts of reflective means for each overlapping part results from the relationship:

$n=(v-h)/2h$, where h is the thickness of the light guide in the place opposite the output surface of the collimating element, v is the height of the output surface, the values h and v being selected in such a way that n can be a natural number.

In one of the preferred embodiments, the normal to the input surface of the collimating element makes an acute, right or obtuse angle with the normal of its output surface while between the input surface and the output surface an inner reflective surface is situated to direct light rays to the output surface.

In one of the preferred embodiments, the top surface and the bottom surface of the light guide are planar and parallel to each other.

In one of the preferred embodiments, the light guide comprises two planarly shaped parts that make an acute, right and obtuse angle together and are connected on a plane that is approximately perpendicular to the output surface of the collimating element and divides it into two parts of an approximately equal size.

In one of the preferred embodiments, the light guide and the reflective means the light guide is fitted with are designed in such a way that they form one integral body.

In one of the preferred embodiments, the light guide and the reflective means the light guide is fitted with, and the collimating element are designed in such a way that they form one integral body.

In one of the preferred embodiments, the light-conductive optical system comprises several planarly shaped light guides connected in such a way that their top surfaces, bottom surface and output surfaces form respective continuous surfaces. The planarly shaped light guides can be preferably designed in such a way that they form one integral body.

CLARIFICATION OF DRAWINGS

Figure 2:
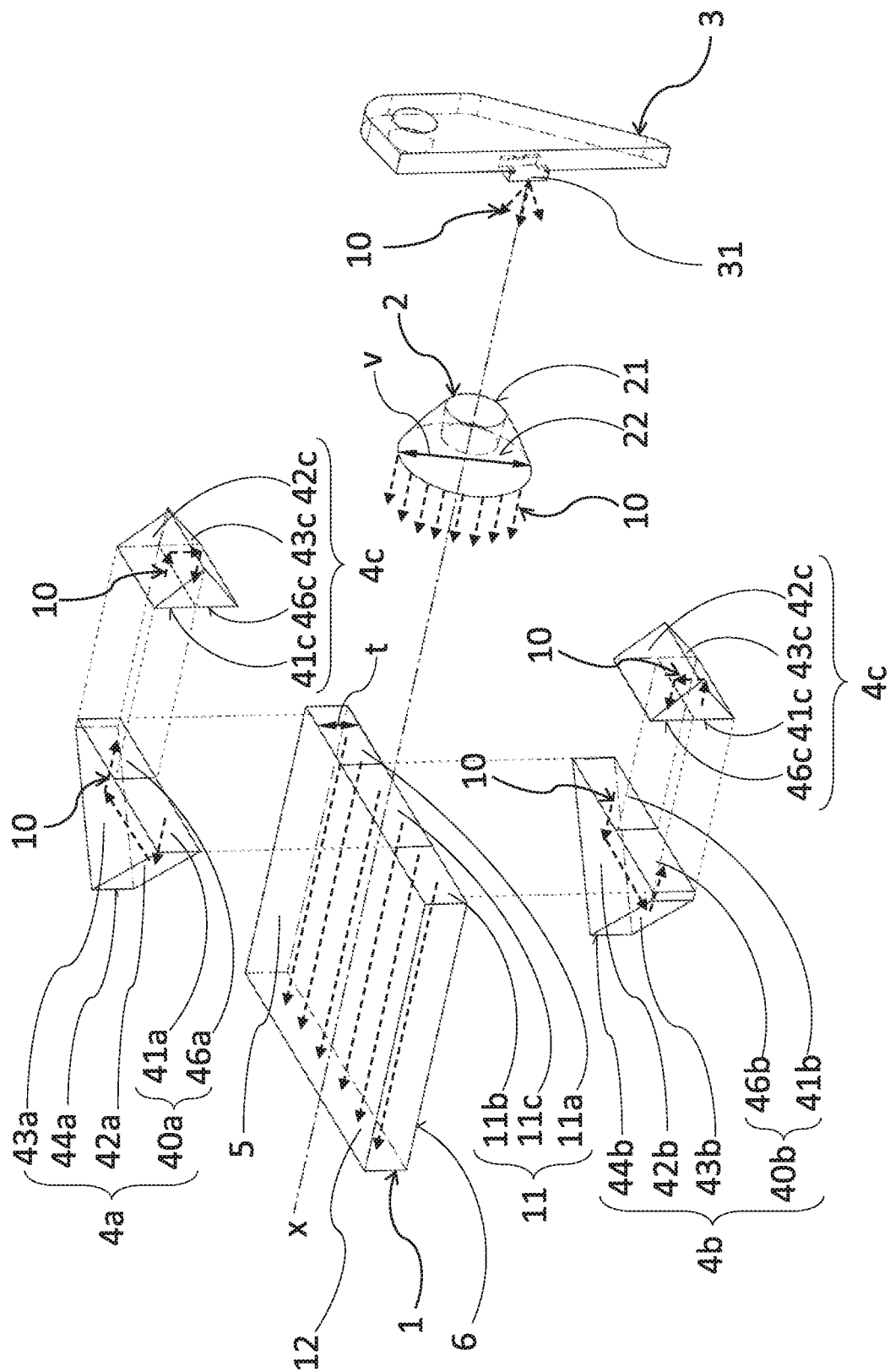
Figure 4B:
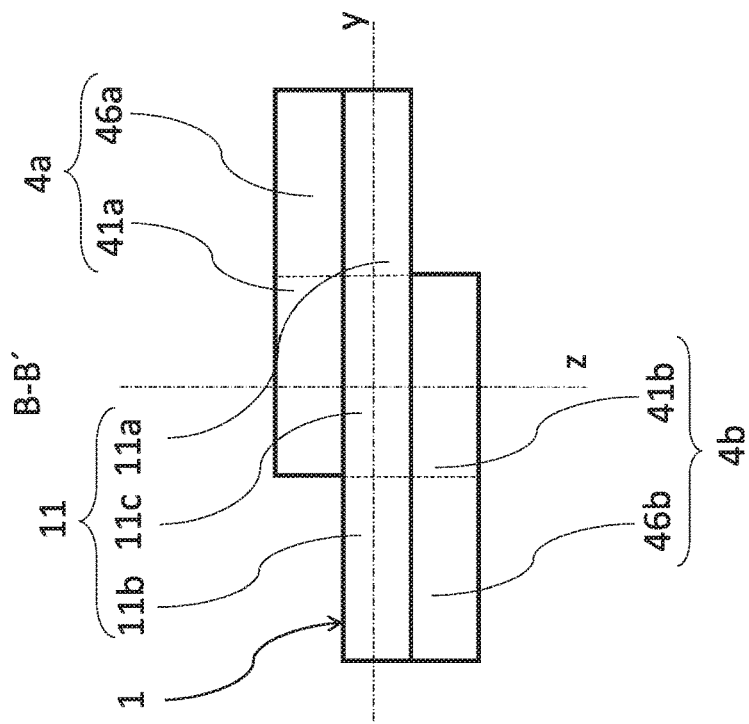
Figure 4A:
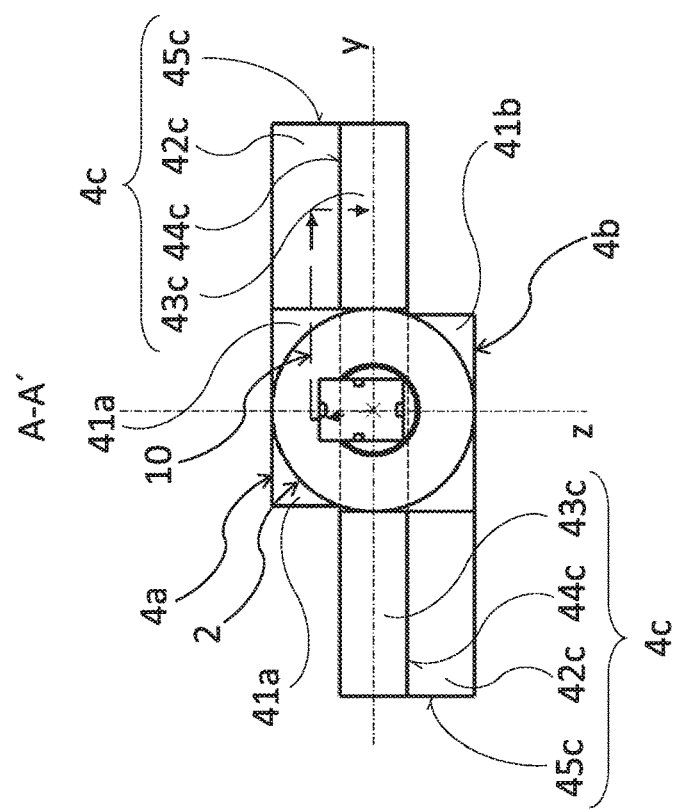
Figure 5:
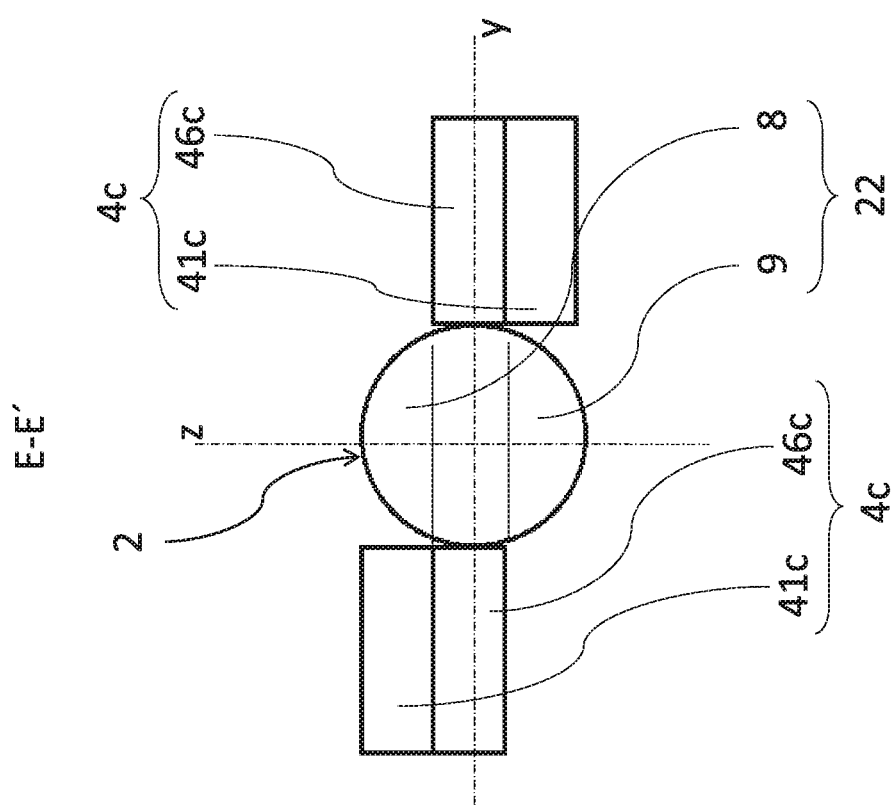
Figure 6:
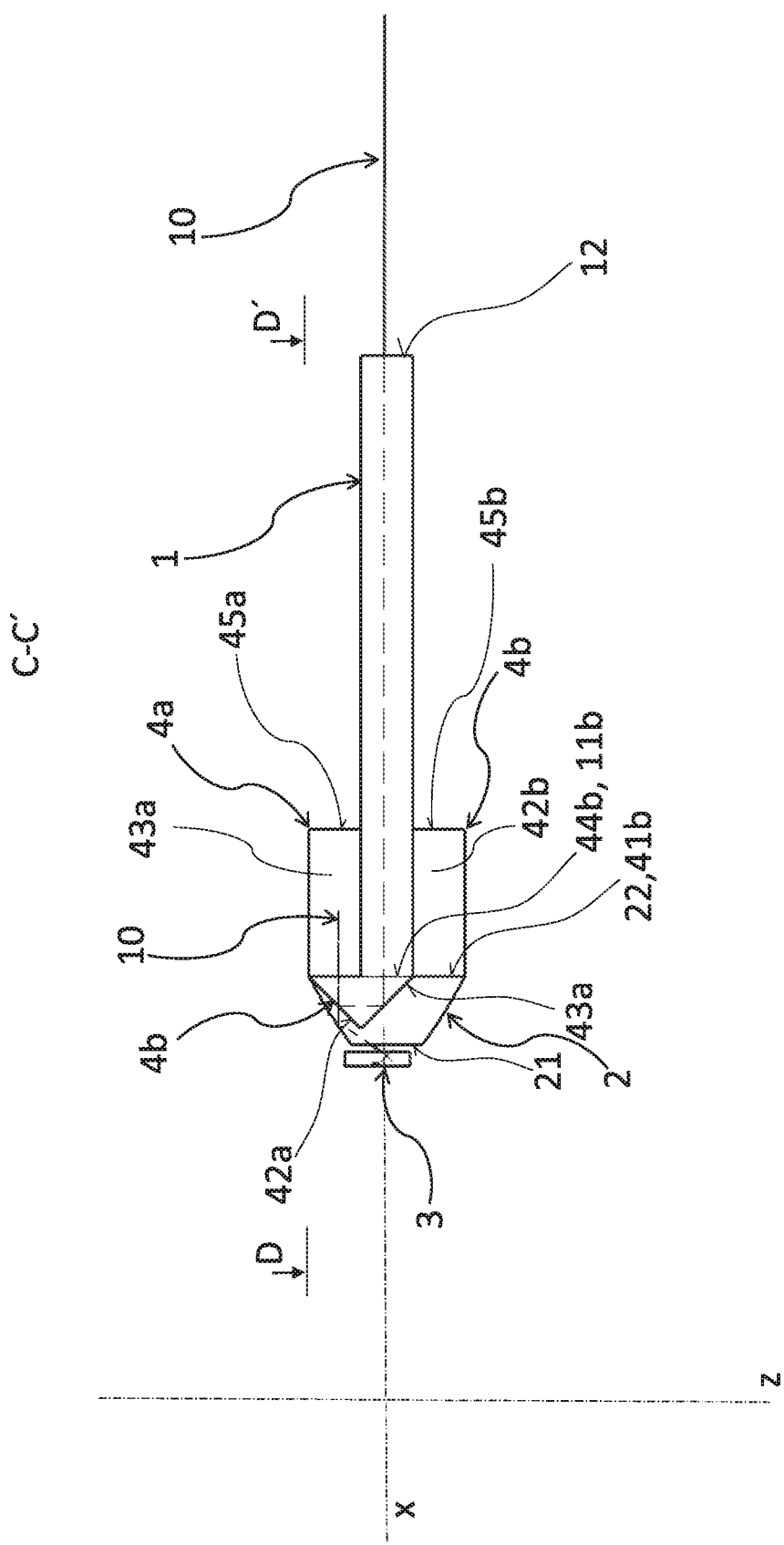
Figure 7:
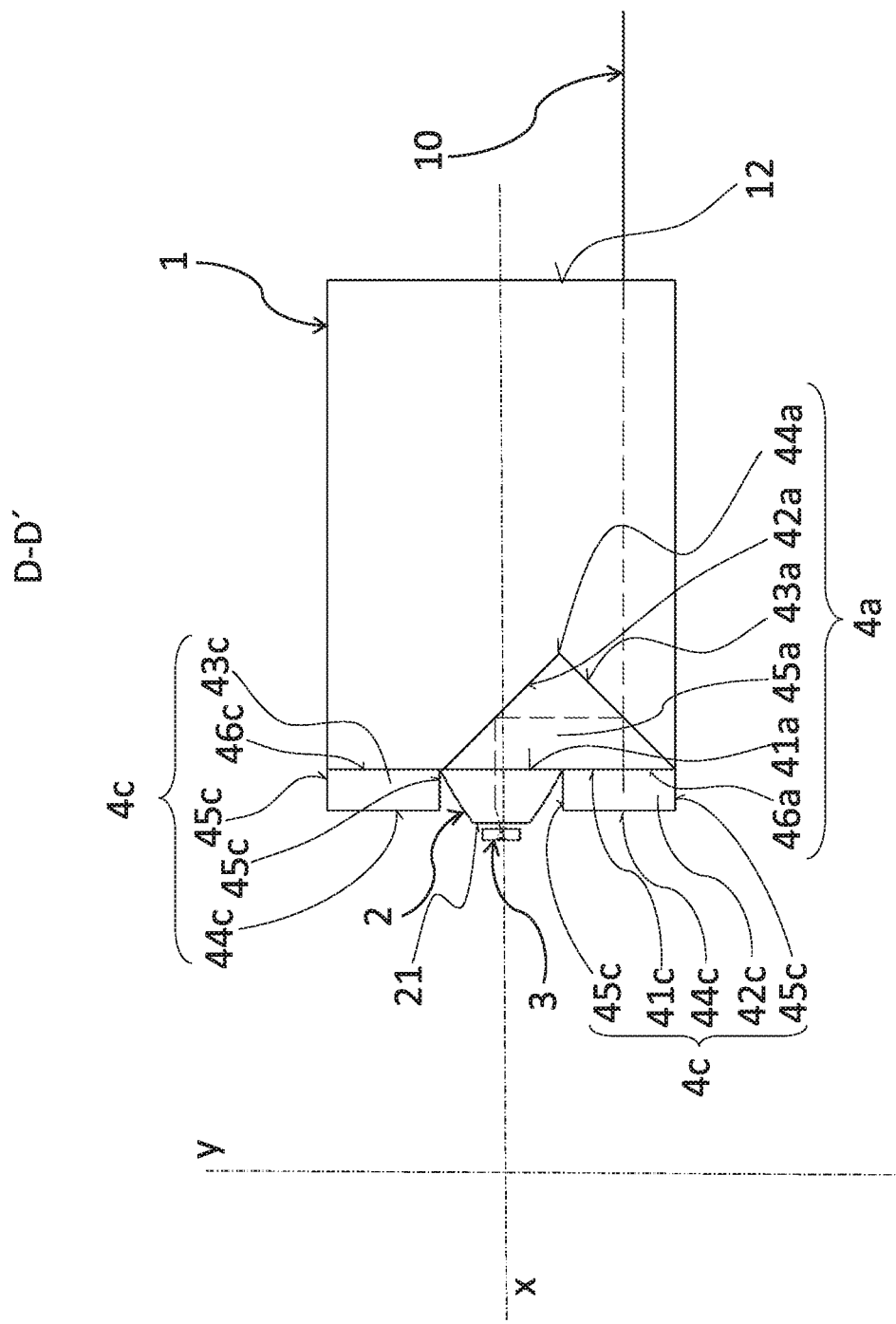
Figure 8:
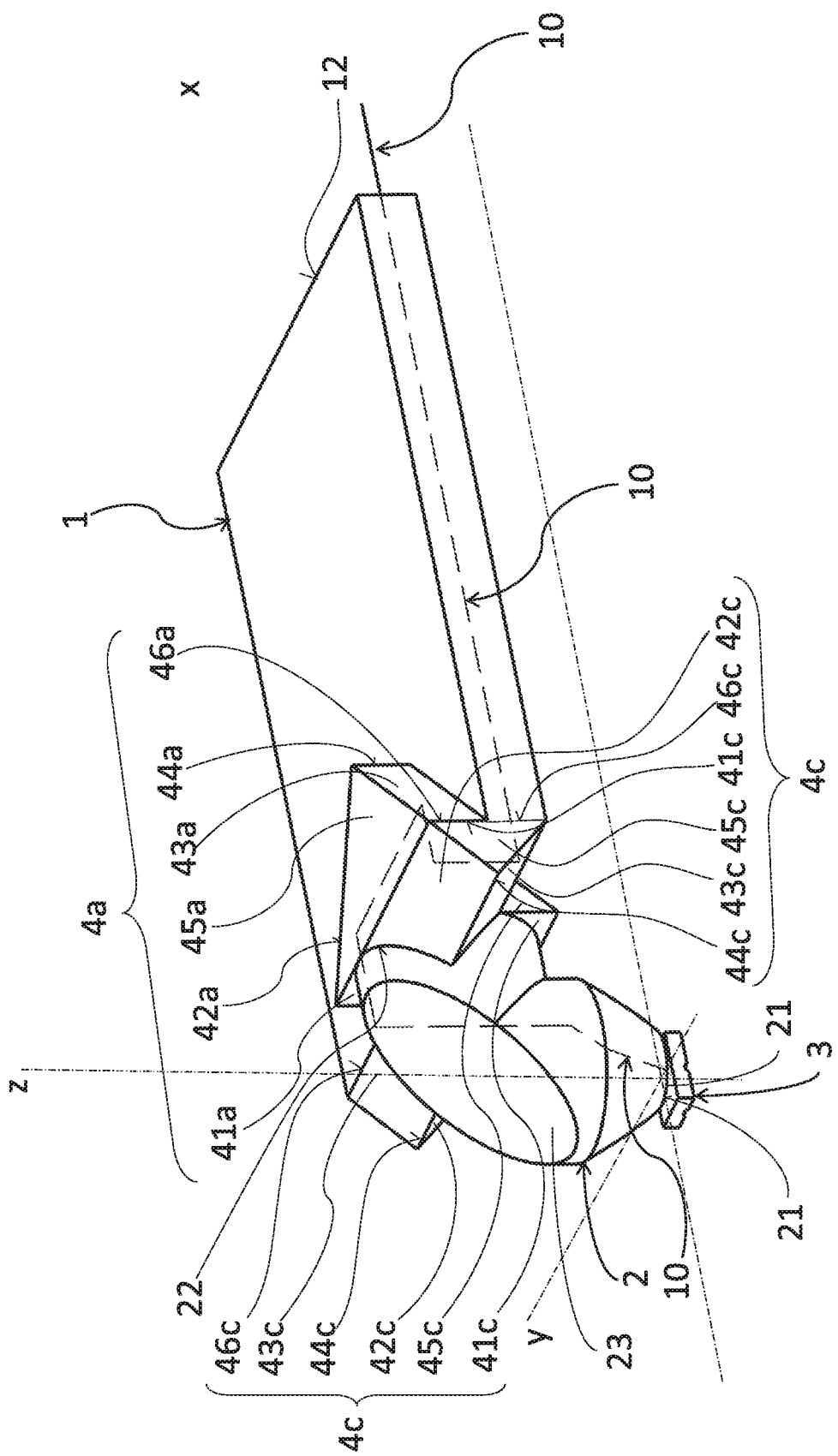
Figure 9:
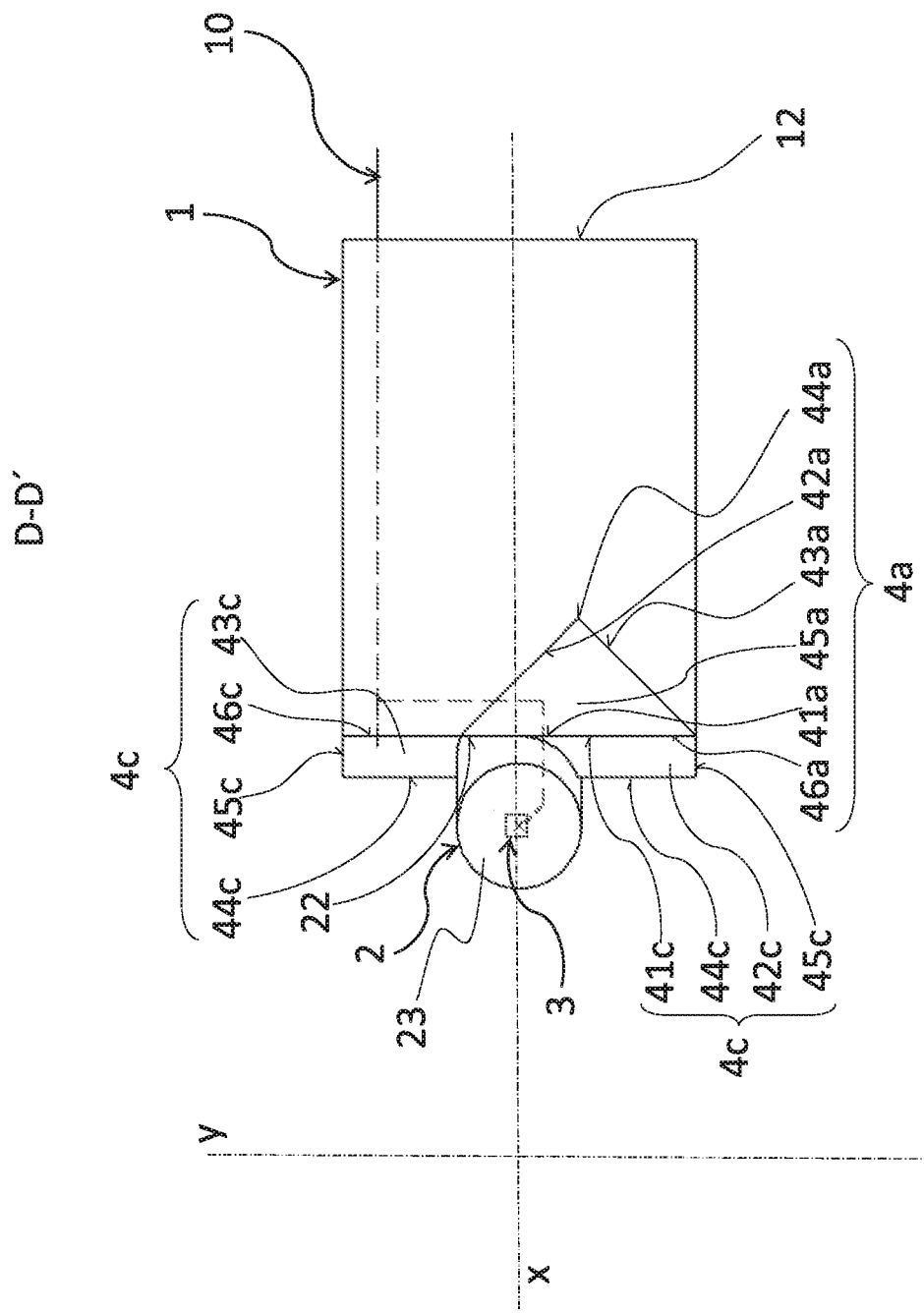
Figure 10:
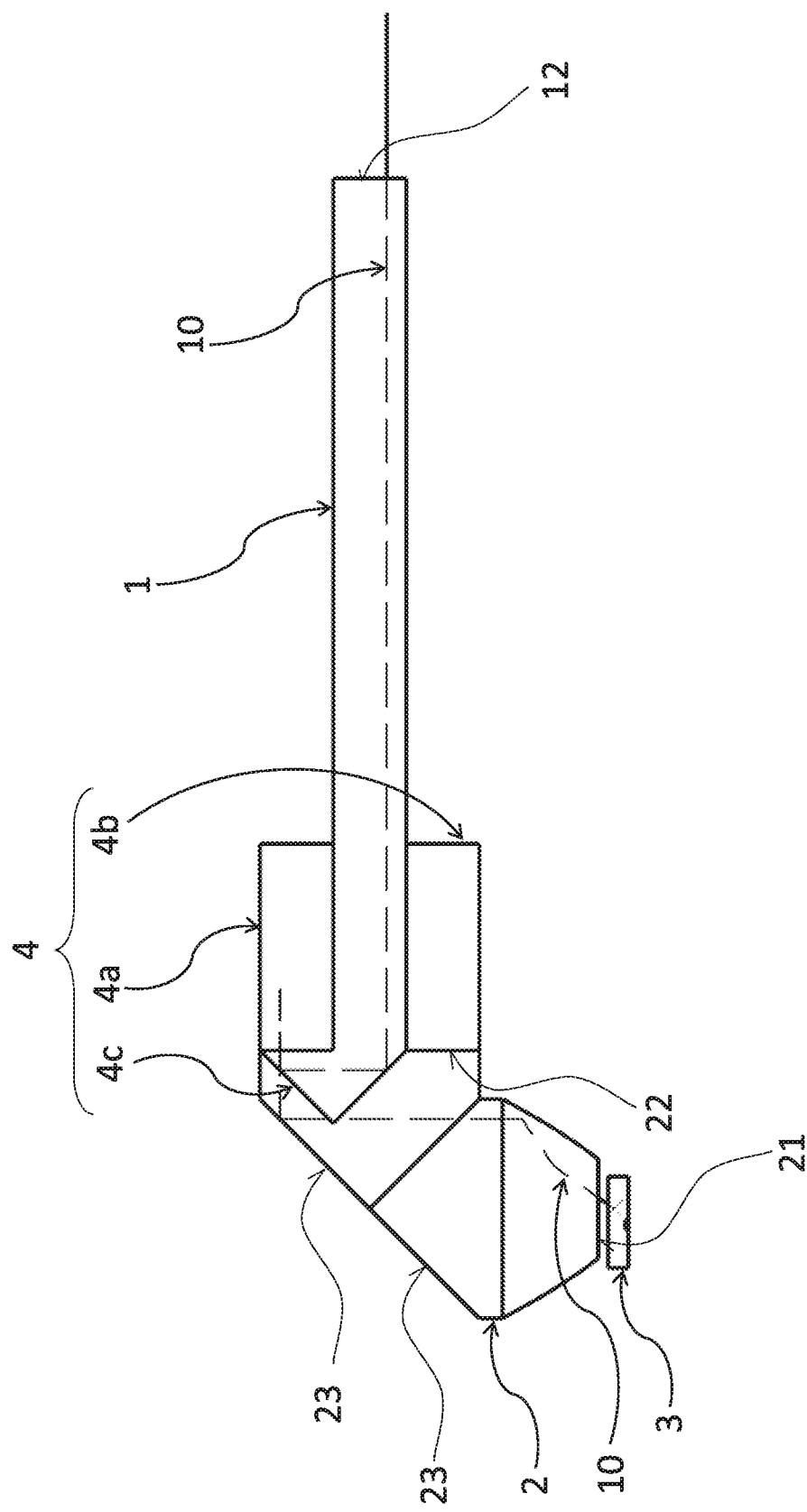
Figure 11:
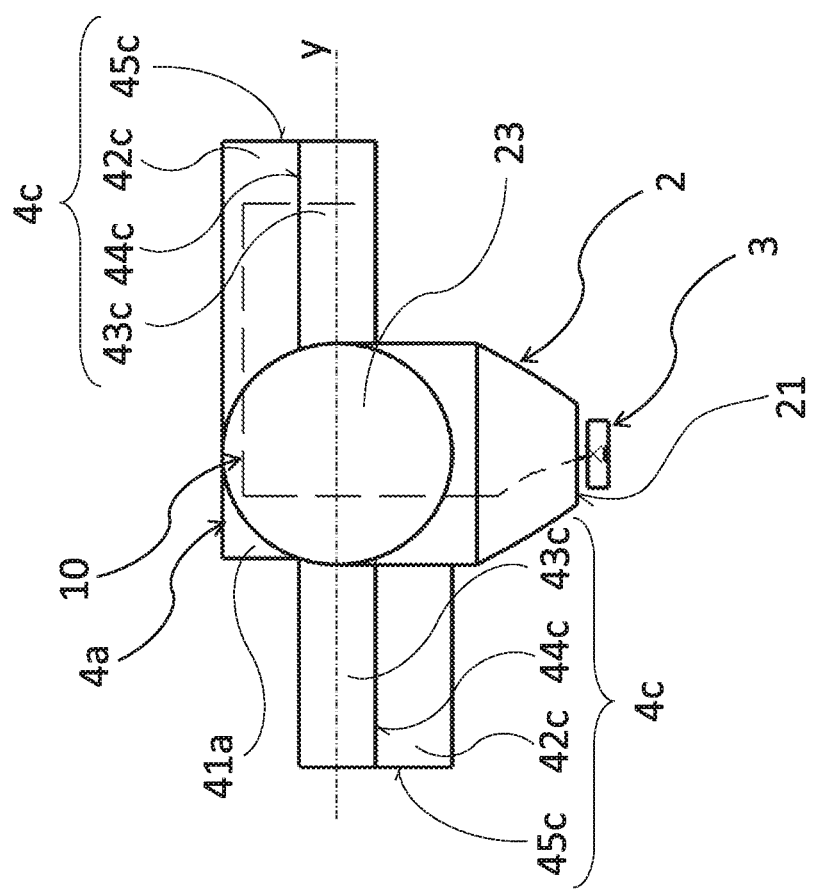
Figure 12:
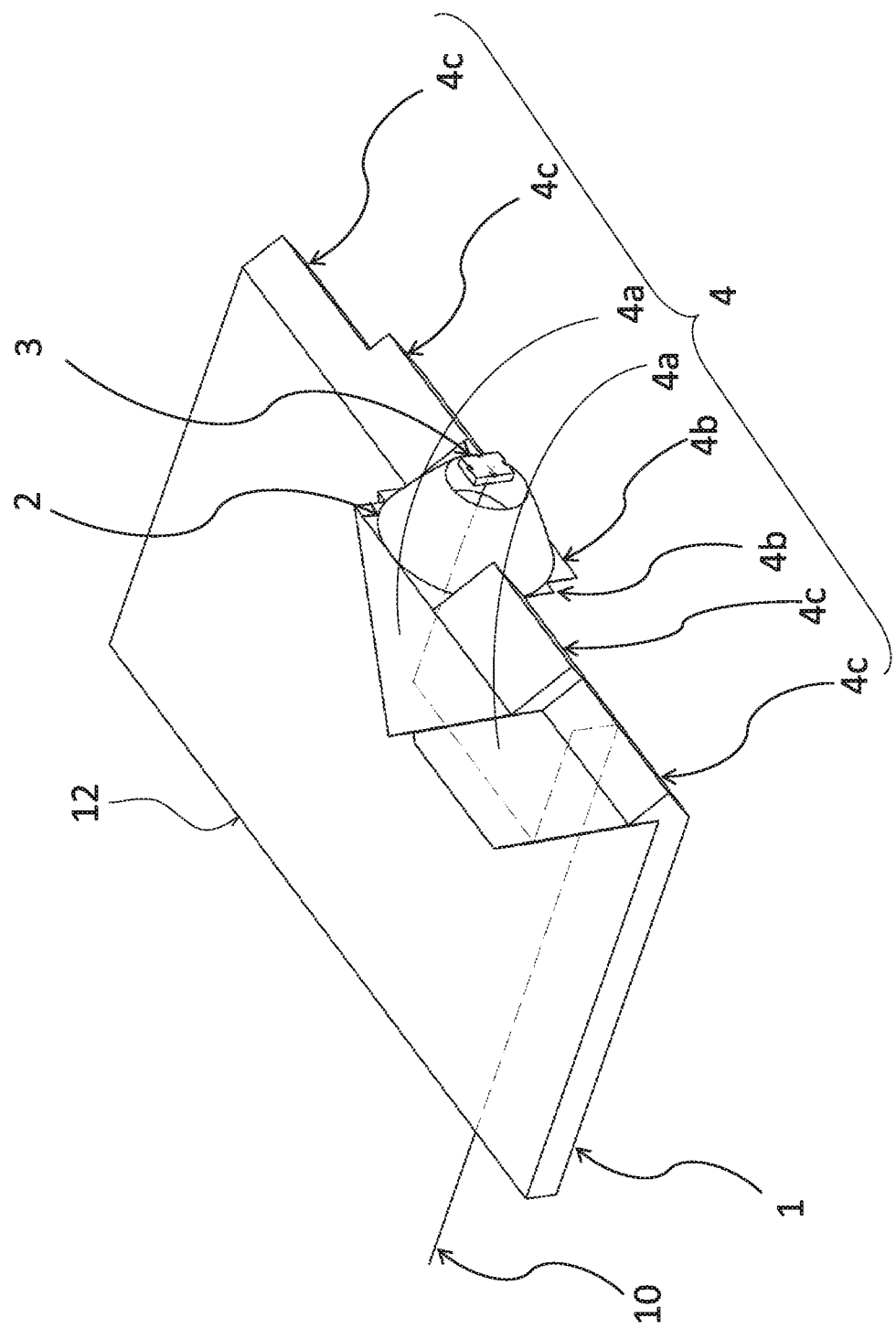
Figure 13:
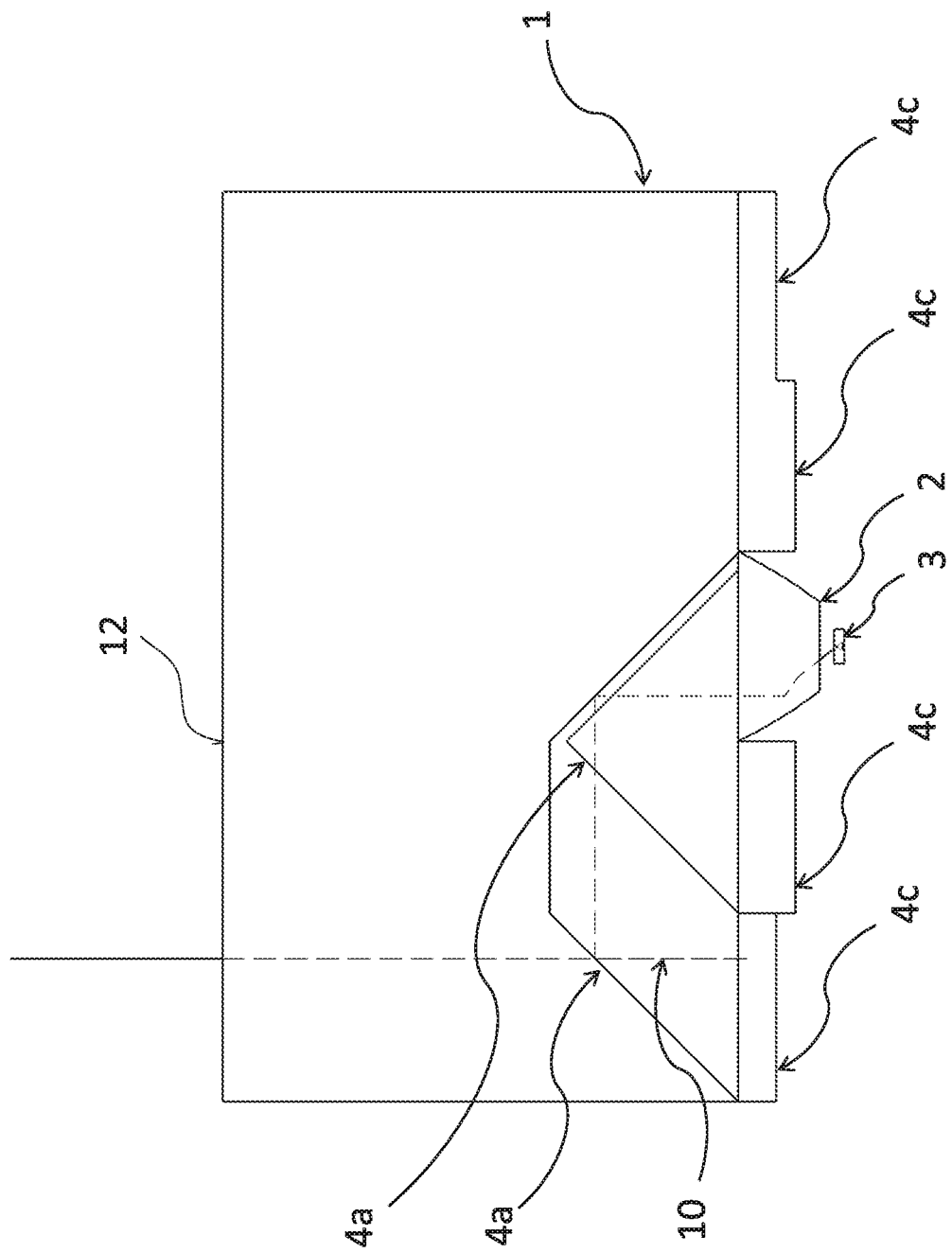
Figure 14:
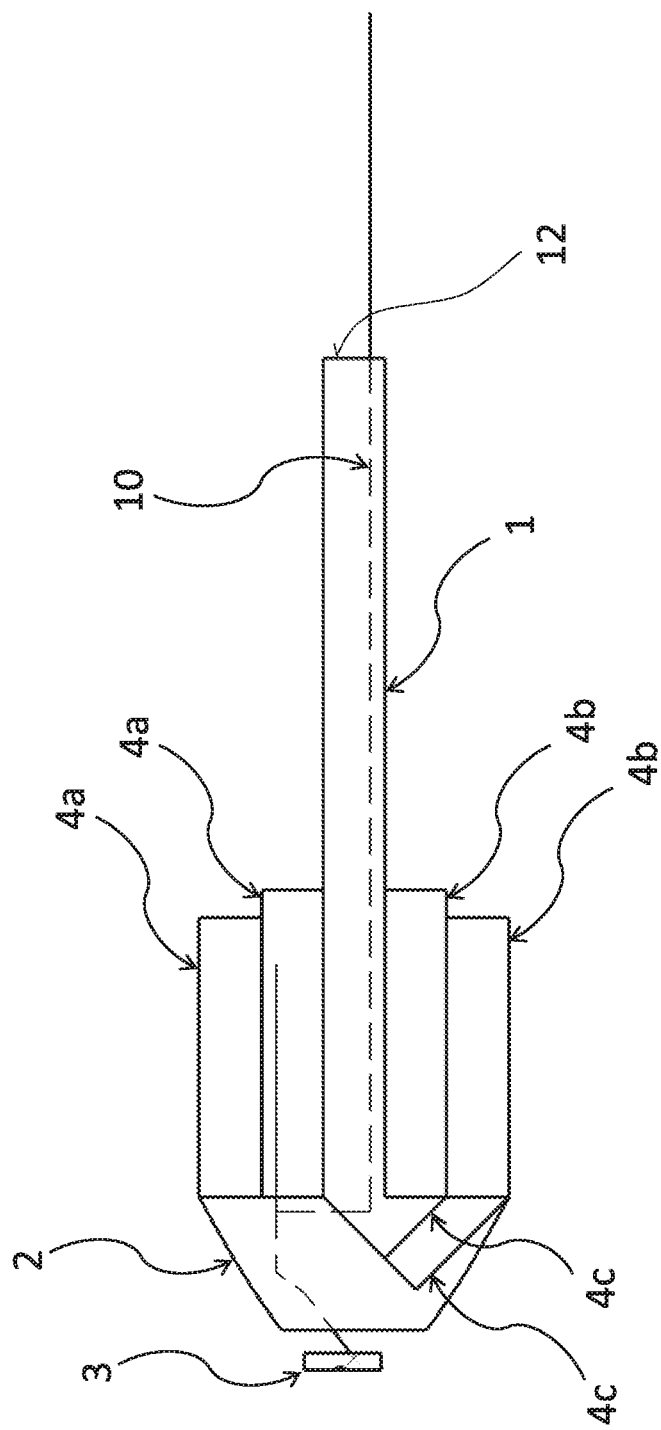
Figure 15:
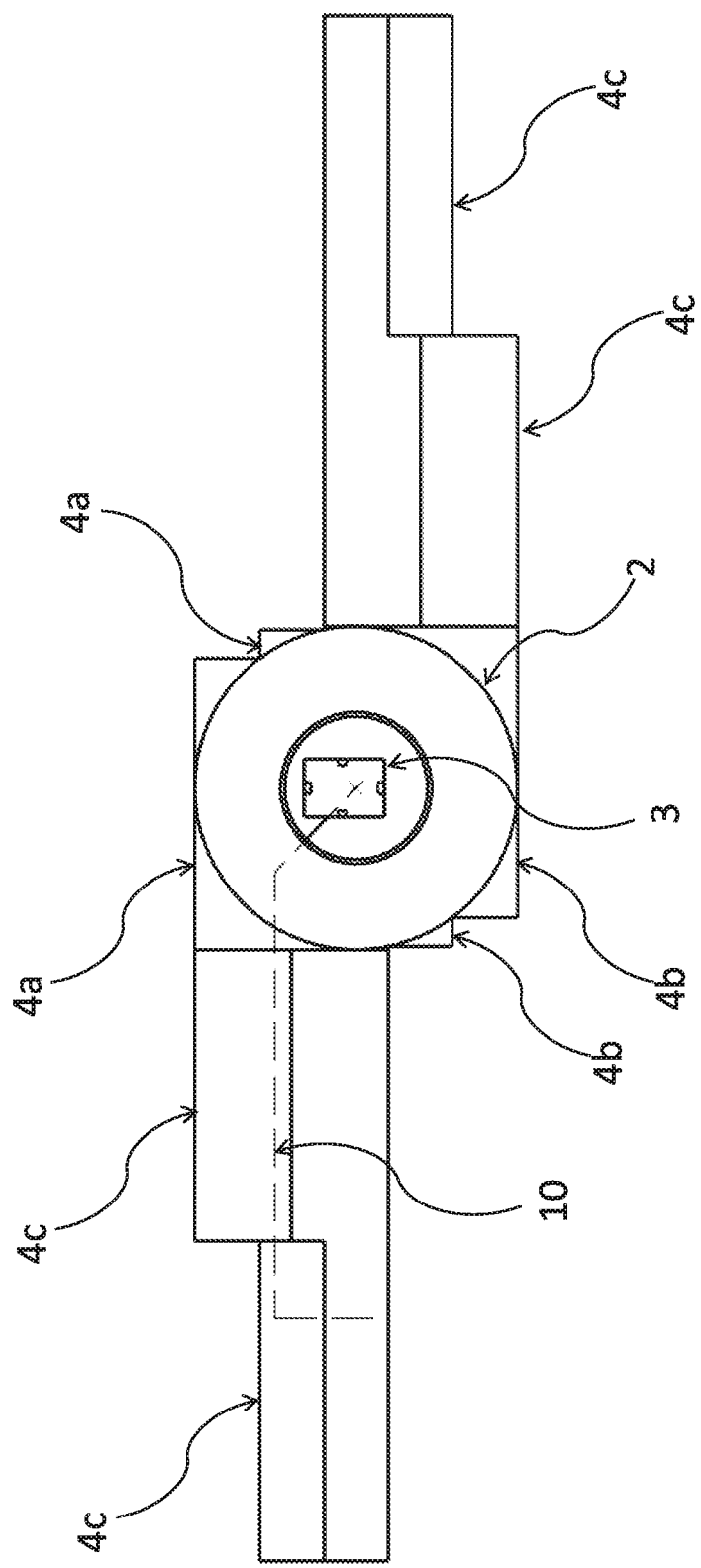
Figure 16:
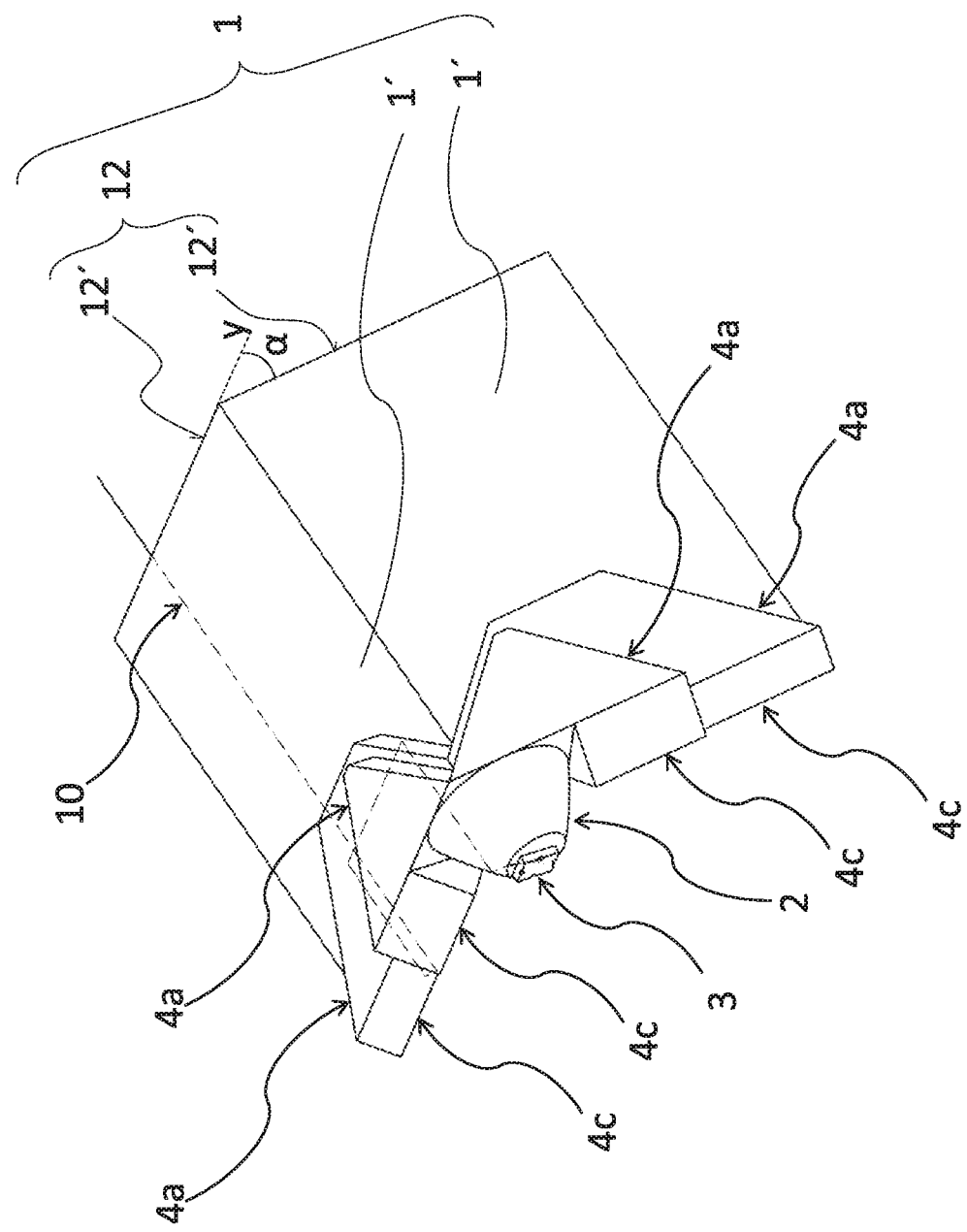
Figure 17:
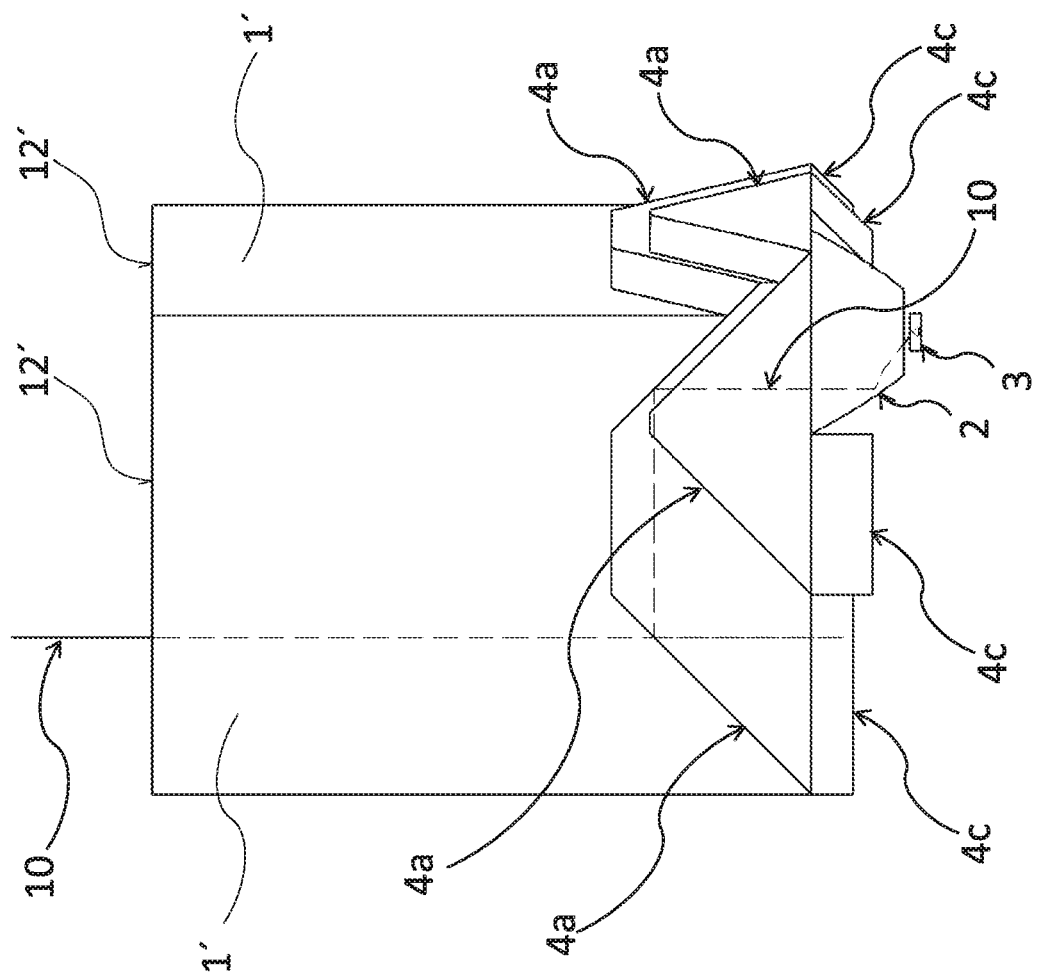
Figure 18:
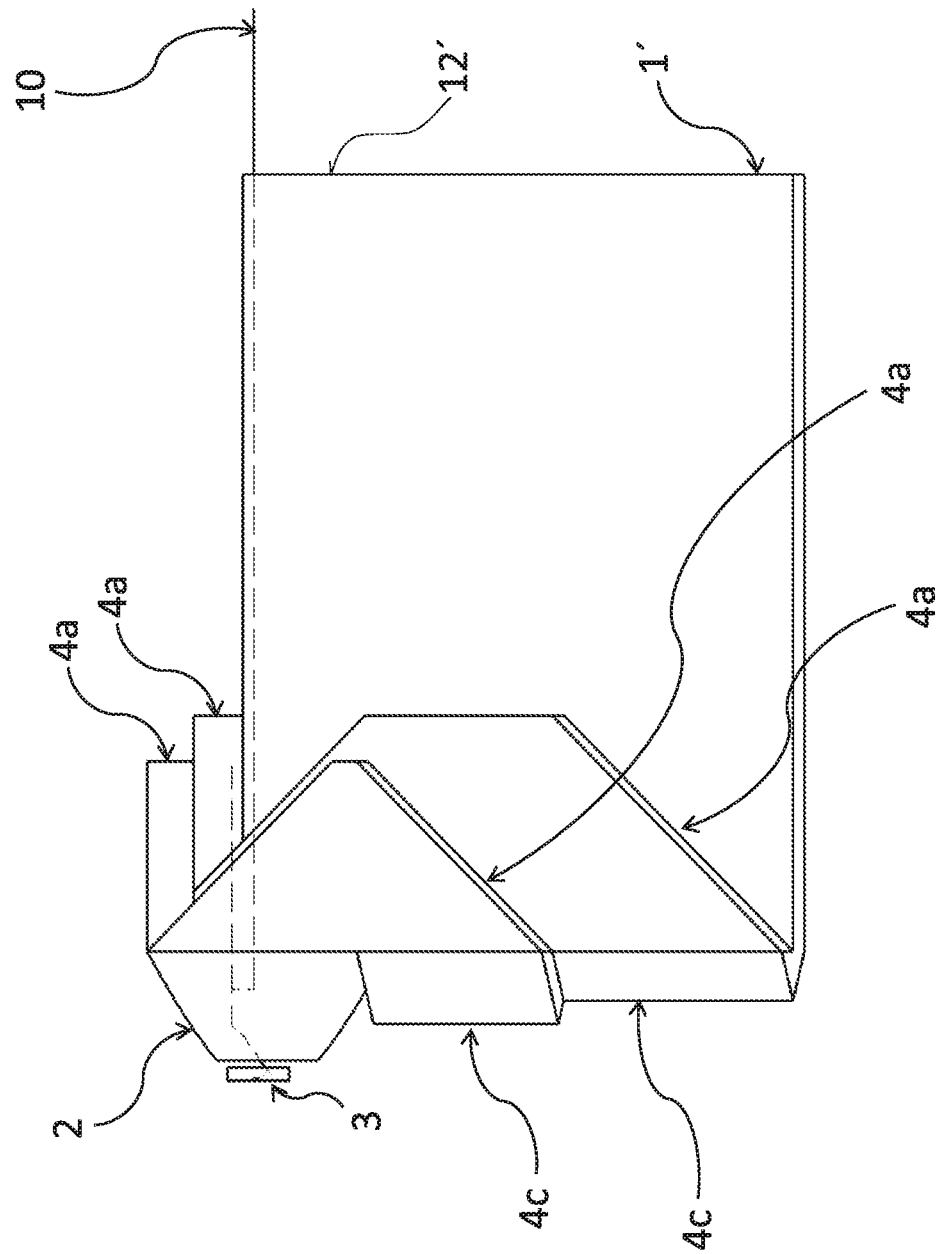
Figure 19:
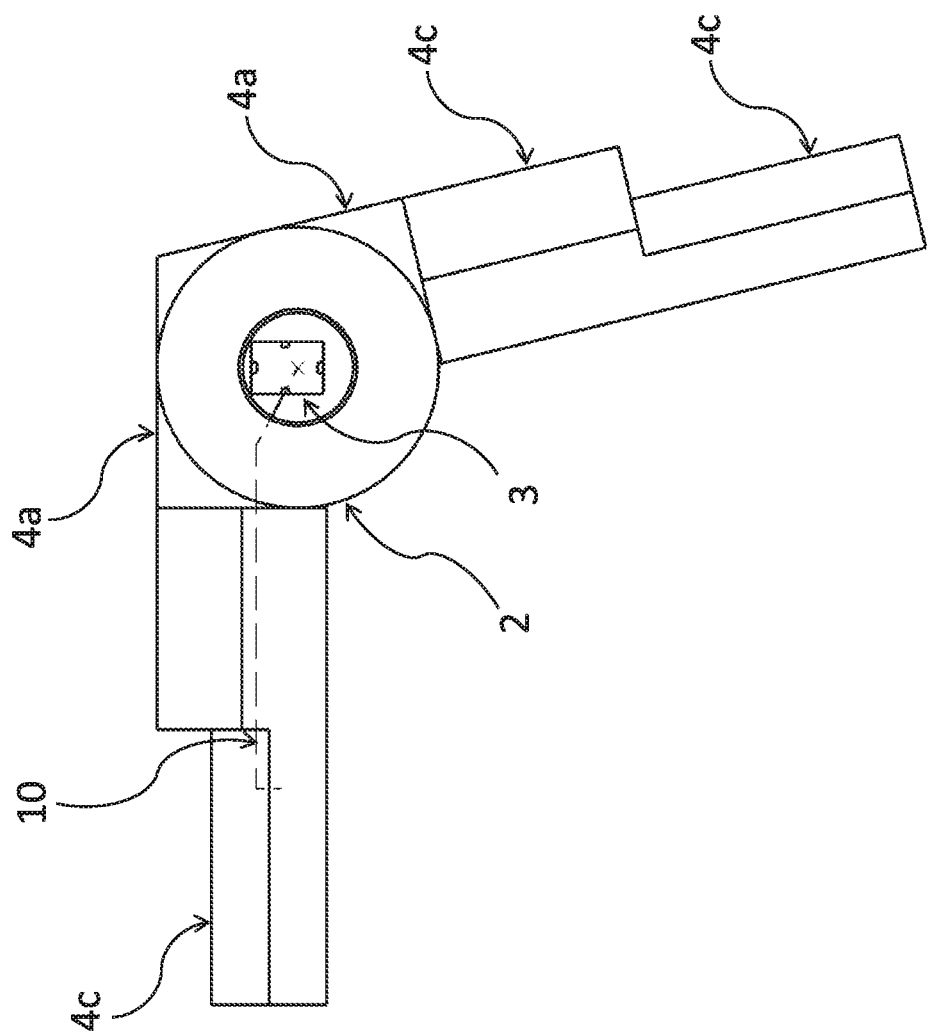
Figure 20:
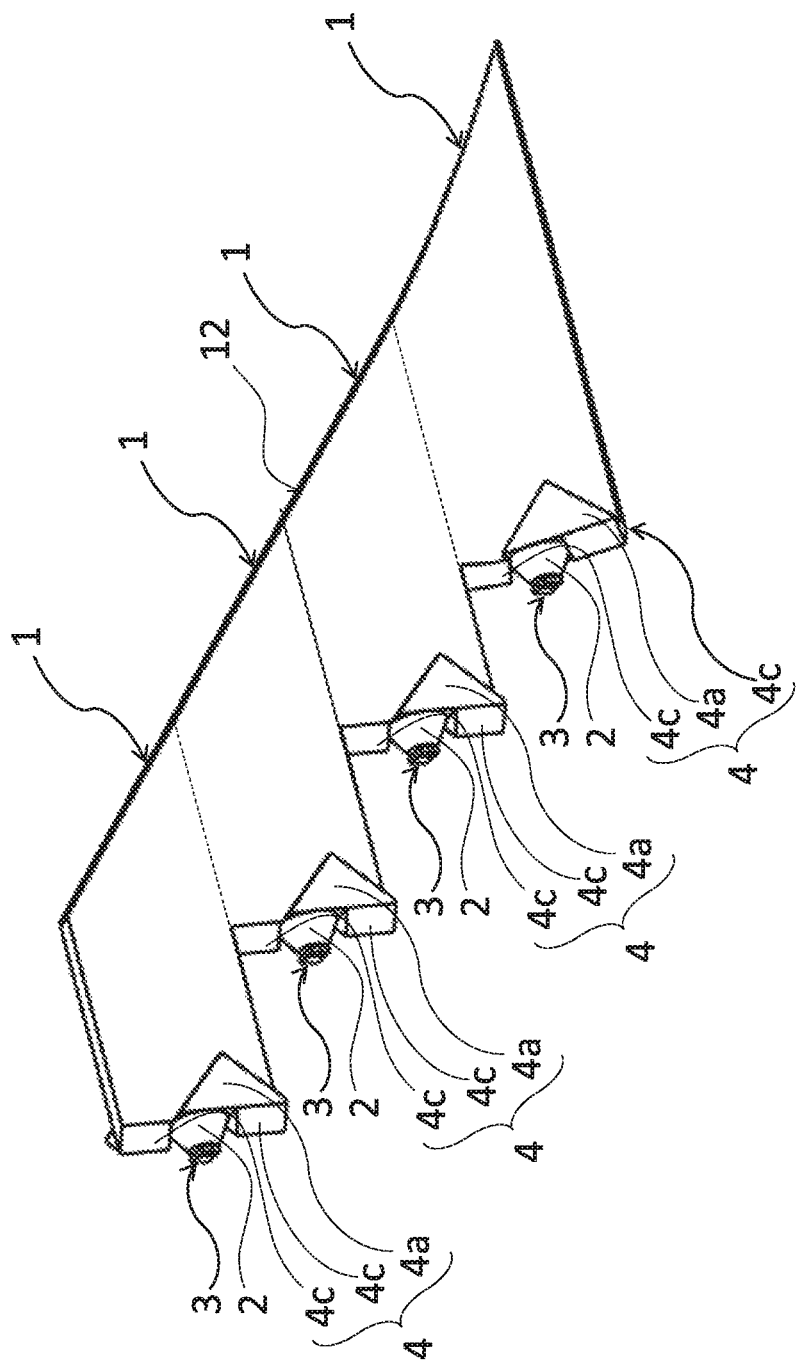
Figure 21:
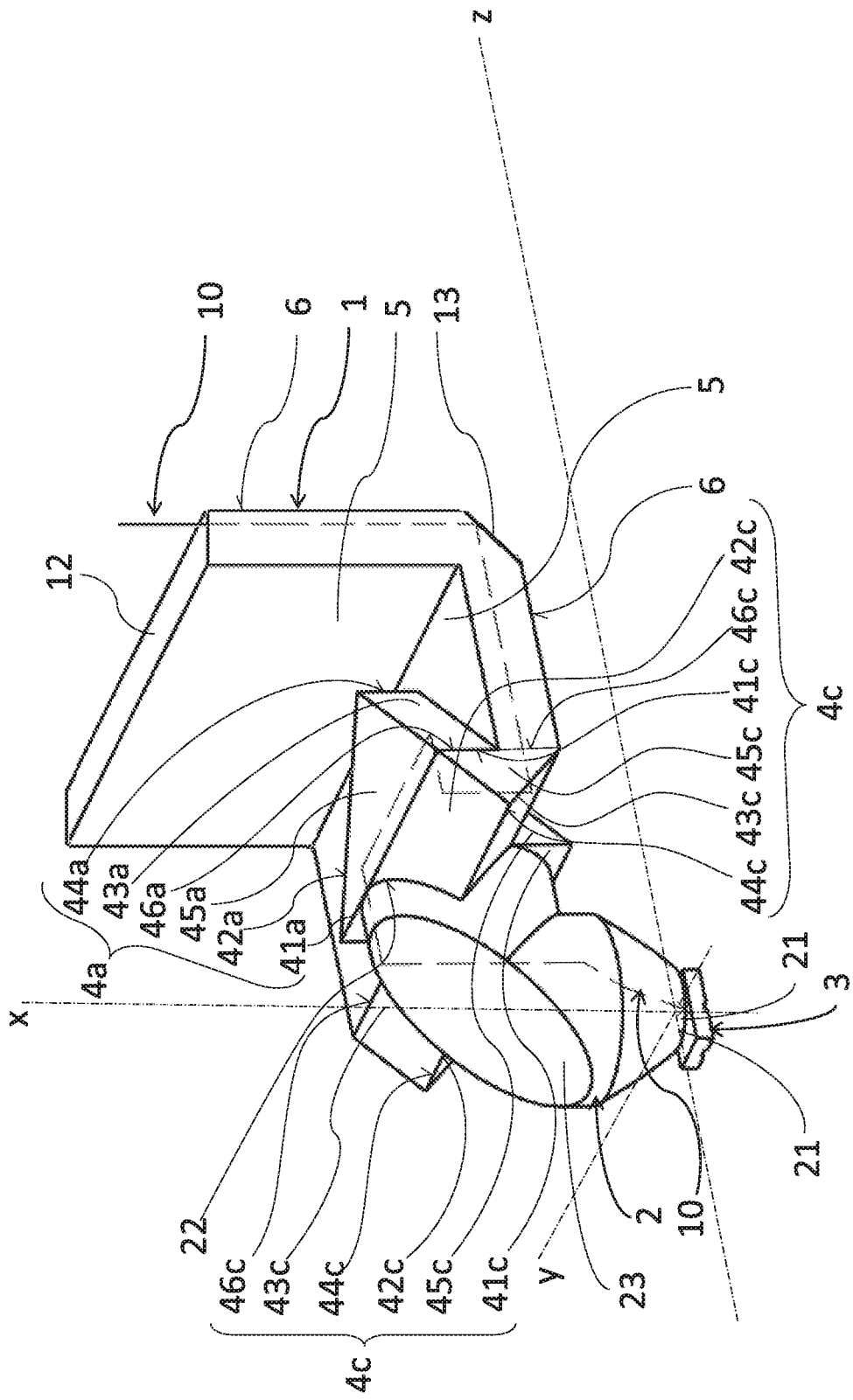

The present invention will be further clarified in more detail with the use of embodiment examples of the invention, referring to the enclosed drawings where:

FIG. 1 shows a perspective top view of the first embodiment example of a light-conductive optical system according to the invention, FIG. 2 shows an exploded view of the light-conductive optical system of FIG. 1, FIG. 3 shows a top view of the light-conductive optical system of FIG. 1, FIG. 4a shows a view in the A-A' direction of the light-conductive optical system of FIG. 3, FIG. 4b shows the B-B' cross-section of the light-conductive optical system of FIG. 3, FIG. 5 shows the E-E' cross-section of the light-conductive optical system of FIG. 3, FIG. 6 shows the C-C' view of the lateral side of the light-conductive optical system of FIG. 3, FIG. 7 shows the D-D' view of the top side of the light-conductive optical system of FIG. 6, FIG. 8 shows a perspective top view of the second embodiment example of a light-conductive optical system according to the invention, FIG. 9 shows a top view of the light-conductive optical system of FIG. 8, FIG. 10 shows a side view of the light-conductive optical system of FIG. 8, FIG. 11 shows a rear view of the light-conductive optical system of FIG. 8, FIG. 12 shows a perspective top view of the third embodiment example of a light-conductive optical system according to the invention, FIG. 13 shows a top view of the light-conductive optical system of FIG. 12, FIG. 14 shows a side view of the light-conductive optical system of FIG. 12, FIG. 15 shows a rear view of the light-conductive optical system of FIG. 12, FIG. 16 shows a perspective top view of the fourth embodiment example of a light-conductive optical system according to the invention, FIG. 17 shows a top view of the light-conductive optical system of FIG. 16, FIG. 18 shows a side view of the light-conductive optical system of FIG. 16, FIG. 19 shows a rear view of the light-conductive optical system of FIG. 16, FIG. 20 shows a perspective top view of the fifth embodiment example of a light-conductive optical system according to the invention, and FIG. 21 shows a perspective top view of the sixth embodiment example of a light-conductive optical system according to the invention.

EXAMPLES OF EMBODIMENTS OF THE INVENTION

FIGS. 1, 2, 3, 4a, 4b, 5, 6 and 7 show the first embodiment example of a light-conductive optical system according to the present invention, which comprises a planarly shaped light guide 1 having the shape of a plate and a collimating element 2 having the form of a rotary body and a light-conductive reflective array 4 of four reflective means 4a, 4b, 4c. The light guide 1, the collimating element 2 and the reflective means 4a, 4b, 4c preferably form an integral body that is made from an optically transparent material and is used to guide light rays 10 emitted by the light unit 3 comprising at least one light source 31, e.g. LED.

The collimating element 2 is oriented with its input surface 21 towards the light source 31 to bind light rays 10 emitted in the horizontal direction and with its output surface 22 it is oriented towards the input surface 41a of the top reflective means 4a, towards the input surface 41b of the bottom reflective means 4b as well as to the partial surface 11c of the light guide 1. The binding surface 11 comprises a partial surface 11c positioned opposite the output surface 22 of the collimating element 2, and a partial surface 11a, 11b continuing the partial surface 11c at both the sides of the partial surface 11c.

The height v of the output surface 22 of the collimating element 2 is bigger than the thickness t of the light guide 1 in the place opposite the output surface 22 so that the output surface 22 with its overlapping part 8 protrudes above the top surface 5 and with its overlapping part 9 below the bottom surface 6 of the light guide 1. The light guide 1 is, for each overlapping part 8, 9, fitted with one pair of reflective means 4a, 4b; 4c while in this pair, the reflective means 4a, 4b is positioned with its input surface 41a, 41b opposite the respective overlapping part 8, 9 to bind at least a part of light rays 10 exiting from the overlapping part 8, 9 to the reflective means 4a, 4b, and to reflect them to the reflective means 4c adapted to direct the light rays 10 against the lateral partial surface 11a, 11b by reflection.

The reflective means 4a, 4b is designed as a pentahedron comprising a central surface 40a, 40b, two lateral reflective surfaces 42a, 42b, 43a, 43b intersecting each other along the contact edge 44a, 44b, and two light-conductive inactive surfaces 45a, 45b. Two reflective means 4c are designed as pentahedra comprising a central surface 40c, two reflective surfaces 42c, 43c, intersecting each other along the contact edge 44c, and two lateral light-conductive inactive surfaces 45c. The central surface 40c of the rear reflective means 4c consists of an input surface 41c and output surface 46c. The reflective surfaces 42c, 43c of the rear reflective means 4c make the angle of 90° together.

The surfaces 41a, 41b, 41c, 42a, 42b, 42c, 43a, 43b, 43c, 46a, 46b, 46c have the shape of a quadrangle while the first lateral reflective surfaces 42a, 42b of the reflective means 4a, 4b are configured for total reflection of light rays 10 and to direct them to the second lateral reflective surfaces 43a, 43b. The second lateral reflective surfaces 43a, 43b are configured for total reflection of light rays 10 and to direct them to the output surfaces 46a, 46b. The output surfaces 46a, 46b of the reflective means 4a, 4b correspond to the input surfaces 41c of the reflective means 4c with their shape. The reflective surfaces 42c of the reflective means 4c are configured for total reflection of light rays 10 and to direct them to the second reflective surfaces 43c. The second reflective surfaces 43c are configured for total reflection of light rays 10 and to direct them to the output surfaces 46c. The output surfaces 46c of the reflective means 4c correspond to the lateral partials surfaces 11b, 11a of the light guide 1 with their shape. Light rays 10 can be emitted from the collimating element 2 to the output surface 12 of the light guide 1 directly as well as indirectly through the light-conductive reflective array 4.

Generally, the light guide 1 used by the light-conductive system according to the invention is a planarly shaped light guide, i.e. a light guide whose thickness t (see FIG. 2) is substantially smaller than its two remaining dimensions. The light guide 1 has the top surface 5 and bottom surface 6 (see FIG. 2 and FIG. 21), which may be e.g. planar (FIG. 2), but they may also be e.g. broken (FIG. 21). The collimating element 2 has an output surface 22 that has the height v (see FIG. 2) measured in the same direction in which the thickness t is measured. If the collimating element 2 is in its intended position where the partial surface 11c, which is part of the binding surface 11 of the light guide 1, is located opposite the output surface 22 of the collimating element 2, a part of the output surface 22—this part is referred to as the overlapping part 8, 9 (see FIG. 5)—reaches above the top surface 5 and/or the bottom surface 6 of the light guide 1. This is because according to the invention the height v of the output surface 22 of the collimating element 2 is always bigger than the thickness t of the light guide 1 measured in the place opposite the output surface 22.

FIGS. 8, 9, 10 and 11 show the second embodiment example of a light-conductive optical system according to the present invention wherein the collimating element 2 is oriented with its input surface 21 towards the light source 31 in the direction of the vertical axis z and with its output surface 22 in the direction of axis x towards the light-conductive reflective array 4 of reflective means 4a, 4b and 4c while in the collimating element 2 in the direction of light rays 10, between the input surface 21 and the output surface 22 an inner reflective surface 23 is situated to direct the light rays 10 in the desired direction.

FIGS. 12, 13, 14 and 15 show the third embodiment example of a light-conductive optical system according to the present invention wherein the collimating element 2 is oriented with its output surface 22 towards the light guide 1 and towards the light-conductive reflective array 4 comprising two top reflective means 4a arranged above each other and two bottom reflective means 4b arranged below each other, adapted to bind and direct light rays 10. Two pairs of rear reflective means 4c adapted to direct light rays 10 to the light guide 1 continue the top and bottom reflective means 4a, 4b.

FIGS. 16, 17, 18 and 19 show the fourth embodiment example of a light-conductive optical system according to the present invention wherein the collimating element 2 is oriented with its output surface 22 towards the light guide 1 and towards the light-conductive reflective array 4 comprising two top reflective means 4a arranged above each other, adapted to bind and direct light rays 10. Two pairs of rear reflective means 4c adapted to direct light rays 10 to two planarly shaped parts 1' of the light guide 1 continue the bottom reflective means 4b. The output surfaces 12' of the planarly shaped parts 1' form the output surface 12 of the light guide 1, the longitudinal axes of the output surfaces 12' making the angle α.

In general, it is preferable for the overlapping part 8, 9 to have a height that is a whole multiple of the thickness t of the light guide 1. In such a case, the number n of the pairs of reflective means 4a, 4b; 4c wherein each of the pairs comprises one reflective means 4a, 4b and the associated one reflective means 4c for each overlapping part 8, 9, is preferably based on the relationship:

$$n=(v-h)/2h, \text{ where}$$

h is the thickness of the light guide 1 in the place opposite the output surface 22 of the collimating element 2, and v is the height of the output surface 22 while, as mentioned above, the values h and v are selected in such a way that n can be a natural number.

As indicated in FIG. 20, showing the fifth exemplary embodiment of a light-conductive optical system according to the invention, individual light guides 1 can be situated next to each other and preferably made as an integral molding to produce a combined light guide with a continuous output surface 12 of light rays 10. Light rays 10 are sent to the output surface 12 by means of several light-conductive reflective arrays 4, each of them comprising reflective means 4a, 4b and 4c and one collimating element 2 being assigned to it.

As indicated in FIG. 21, showing the sixth exemplary embodiment of a light-conductive optical system according to the invention, the light guide 1 can be fitted with an inner reflective surface 13 to direct light rays 10 to the output surface 12 of light rays 10.

LIST OF REFERENCE MARKS

1—light guide
1'—planarly shaped part (of the light guide)
5—top surface
6—bottom surface
8, 9—overlapping part
11—binding surface
11a, 11b—lateral partial surface
11c—partial surface
12—output surface
13—inner reflective surface
2—collimating element
21—input surface
22—output surface
23—reflective surface
3—light unit
31—light source
4—light-conductive reflective means
4a, 4b, 4c—reflective means
40a, 40b, 40c-central surface
41a, 41b, 41c-input surface
42a, 42b-lateral reflective surface
42c-reflective surface
43a, 43b-lateral reflective surface
43c-reflective surface
44a, 44b, 44c—contact edge
45a, 45b, 45c-inactive surface
46a, 46b, 46c-output surface
10—light ray
n—number
v—height
t—thickness
x—optical axis

The invention claimed is:

1. A light-conductive optical system comprising at least one planarly shaped light guide made from an optically transparent material with an associated light unit and a collimating element to collimate light rays emitted from the light unit, wherein an edge of the light guide comprises a binding surface to bind the light rays collimated by the collimating element to the light guide and an output surface for output of the light rays out of the light guide,
wherein the output surface and the binding surface are situated on surfaces that transversally connect a top surface and a bottom surface of the light guide,
wherein the binding surface comprises a primary surface situated opposite an exit surface of the collimating element, and at one or both sides of the primary surface, a secondary surface integrally continuing the primary surface,
wherein a height (v) of the exit surface is bigger than a height (t) of the binding surface so that the exit surface protrudes above the top surface and/or below the bottom surface of the light guide with an overlapping part,
wherein the light guide is, for each overlapping part, fitted with one or more pairs of reflective means,
wherein in each of the pairs of reflective means, a first reflective means is situated with an input surface opposite the overlapping part to bind at least a part of the light rays exiting from the overlapping part to the first reflective means and to reflect the light rays to a second reflective means adapted to direct the light rays against a secondary surface by reflection.

2. The light-conductive optical system according to claim 1, wherein an output surface of the second reflective means is situated opposite the secondary surface.

3. The light-conductive optical system according to claim 1, wherein the optical system comprises two overlapping parts.

4. The light-conductive optical system according to claim 3, wherein the height (v) of the exit surface amounts to three times the thickness (t) of the binding surface and the heights of the overlapping parts are equal to the height (t) of the binding surface.

5. The light-conductive optical system according to claim 3, wherein the light guide is, for each of the overlapping parts, equipped with at least two pairs of reflective means, the first reflective means of the at least two pairs of reflective means being positioned on each other so that their input surfaces positioned one over another form a continuous input surface and a projection of the overlapping part in a direction of the output of the light rays from the overlapping part is completely included in this continuous input surface.

6. The light-conductive optical system according to claim 5, wherein the second reflective means of the at least two pairs of reflective means are situated next to each other with their output surfaces opposite the partial lateral surface.

7. The light-conductive optical system according to claim 5, wherein a number (n) of the at least two pairs of reflective means for each overlapping part is based on the relationship:

$n=(v-t)/2t$, where t is the height of the binding surface, v is the height of the exit surface, the values t and v being selected in such a way that n can be a natural number.

8. The light-conductive optical system according to claim 1, wherein a normal to an input surface of the collimating element makes an acute, right or obtuse angle with a normal of the exit surface of the collimating element, wherein an inner reflective surface is situated between the input surface of the collimating element and the exit surface of the collimating element to direct the light rays to the exit surface of the collimating element.

9. The light-conductive optical system according to claim 1, wherein the top surface and the bottom surface of the light guide are planar and parallel to each other.

10. The light-conductive optical system according to claim 1, wherein the light guide comprises two planarly shaped parts that make an acute, right and obtuse angle together and are connected on a plane that is approximately perpendicular to the exit surface of the collimating element and divides the exit surface of the collimating element into two parts of an approximately equal size.

11. The light-conductive optical system according to claim 1, wherein the light guide and the reflective means that the light guide is fitted with are designed in such a way that they form one integral body.

12. The light-conductive optical system according to claim 11, wherein the light guide, the reflective means that the light guide is fitted with, and the collimating element are designed in such a way that they form one integral body.

13. The light-conductive optical system according to claim 1, wherein the optical system comprises several planarly shaped light guides connected in such a way that their top surfaces, bottom surfaces and output surfaces form respective continuous surfaces.

14. The light-conductive system according to claim 13, wherein the planarly shaped light guides are designed in such a way that they form one integral body.

* * * * *